(12) United States Patent  (10) Patent No.: US 7,543,311 B2
Nakada  (45) Date of Patent: Jun. 2, 2009

(54) DISK UNIT

(75) Inventor: Tomonori Nakada, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 336 days.

(21) Appl. No.: 11/094,514

(22) Filed: Mar. 31, 2005

(65) Prior Publication Data

US 2005/0276182 A1  Dec. 15, 2005

(30) Foreign Application Priority Data

Mar. 31, 2004  (JP) ............................. 2004-103616

(51) Int. Cl.
 *G11B 7/00* (2006.01)
 *G11B 17/03* (2006.01)
(52) U.S. Cl. .................. 720/677; 720/703; 720/700
(58) Field of Classification Search ............ 720/663, 720/667, 674, 675, 676, 677, 678, 633, 689, 720/620
See application file for complete search history.

(56) References Cited

U.S. PATENT DOCUMENTS

| 4,328,575 | A | * | 5/1982 | Elliott ........................ 369/269 |
| 5,631,894 | A | * | 5/1997 | Takahashi .................... 720/667 |
| 5,995,479 | A | * | 11/1999 | Takizawa et al. ............. 720/675 |
| 6,751,182 | B1 | * | 6/2004 | Shiomi et al. ............. 369/219.1 |
| 6,795,970 | B2 | * | 9/2004 | Wada et al. .................. 720/659 |
| 6,892,386 | B2 | * | 5/2005 | Furuya et al. ................ 720/675 |
| 6,898,798 | B2 | * | 5/2005 | Hamaguchi ................... 720/737 |
| 2001/0005349 | A1 | * | 6/2001 | Maeda ........................ 369/77.2 |
| 2004/0027977 | A1 | * | 2/2004 | Kojima et al. ................ 369/244 |
| 2005/0289579 | A1 | * | 12/2005 | Ohsuga ....................... 720/675 |

FOREIGN PATENT DOCUMENTS

JP  7-93949  4/1995

OTHER PUBLICATIONS

Office Action issued for corresponding Japanese patent application No. 2004-103616 on Jun. 24, 2008.

* cited by examiner

*Primary Examiner*—Brian E Miller
*Assistant Examiner*—Adam B Dravininkas
(74) *Attorney, Agent, or Firm*—Kratz, Quintos & Hanson, LLP

(57) ABSTRACT

A pair of guide shafts 230 supporting an information processing section 240 equipped with a pickup 242 is provided on a mount 210 rotatably disposed in a casing 110 with a turn table for rotatably supporting the optical disc 10 being provided on the rotation end side. An electric moving motor 310 is integrally attached on the bottom side of the casing 110 by an attachment 330 with a lead screw 320 having a spiral engaging groove 321, to which a movement restricting claw 241B of the information processing section 240 is engaged, being coupled coaxially to an output shaft. The configuration moving the information processing section 240 will not contact to the casing 110 when the turn table 222 is rotated to a retracted position retracted from the moving path of the optical disc 10 at the insertion or ejection of the optical disc 10, thus preferably being downsized.

14 Claims, 10 Drawing Sheets

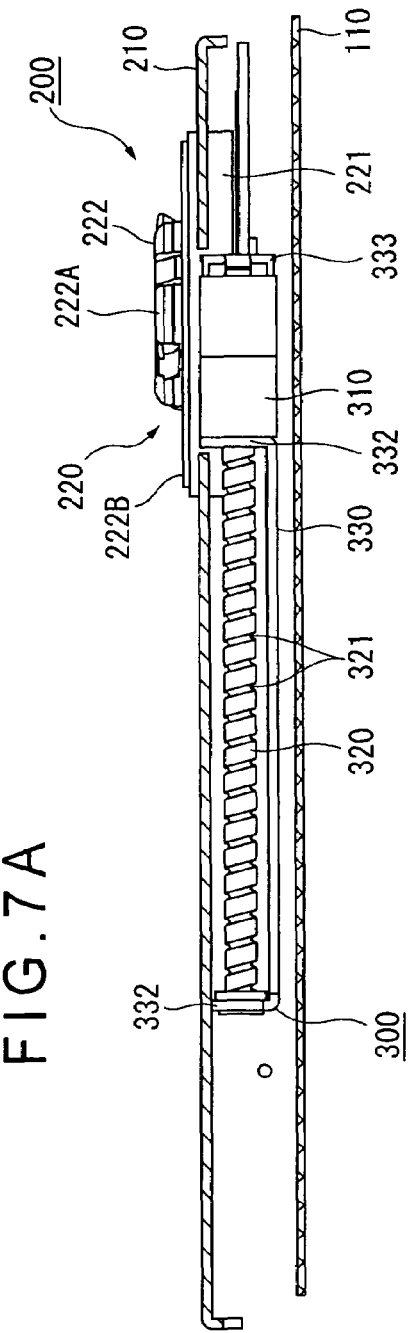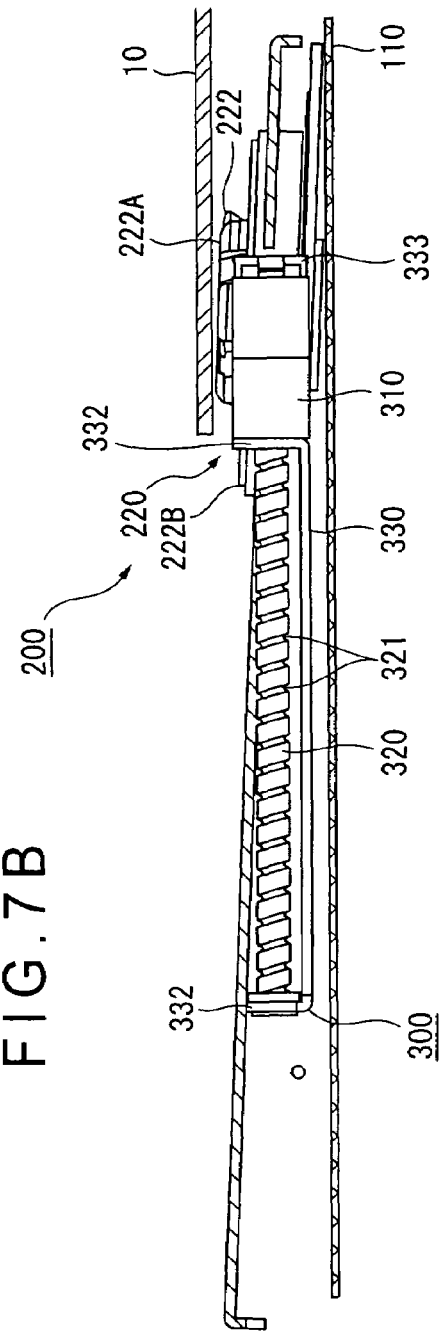

DISK UNIT

BACKGROUND OF THE INVENTION

1. Field of the Invention

The present invention relates to a disk unit that performs at least either information processing of reading out information recorded on a recording surface of a disc recording medium or information processing of recording various pieces of information on the recording surface.

2. Description of Related Art

Conventionally, a slot-in type disk unit has been known as such kind of disk unit, which automatically loads a disc recording medium to a prespecified processing position when the disc recording medium is inserted to a certain position by a user. As the slot-in type disk unit constantly allows the user to insert the disc recording medium, a supporting portion, which rotatably supports the disc recording medium to be rotated during information processing, is retracted from the position for information processing so that the disc recording medium to be inserted will not contact to the supporting portion. When the disc recording medium is inserted and loaded to the certain position, the supporting portion moves the disc recording medium to the position for information processing and rotatably supports it.

As an example of the slot-in type disk unit, a configuration shown in FIGS. 1, 2A and 2B has been known. The disk unit shown in FIGS. 1, 2A and 2B includes a casing 2 having a slit-like opening to which, for example, an optical disc 1 as a disc recording medium is inserted. Provided in the casing 2 are a disc processing section 3 shown in FIG. 1 and a driving section (not shown) for rotating the disc processing section 3. The disc processing section 3 has a mount 3A rotatably supported in the casing 2, the mount 3A being able to be rotate by the driving section. Provided on the mount 3A are a spindle motor 3B provided on the rotation end side of the mount 3A, a turntable 3C rotatably supporting the optical disc 1 in a detachably attached manner, which is rotated by the drive of the spindle motor 3B, a pickup 3D performing reading processing to read out information recorded on the optical disc 1 and recording processing to record information, and a processor moving unit 3E for moving the pickup 3D in the radial direction of the optical disc 1.

As shown in FIG. 2B, the turn table 3C side of the disc processing section 3 is rotated to the position retracted from the moving path of the optical disc 1 when the optical disc 1 is inserted and ejected through the opening. As shown in FIG. 2A, when the optical disc 1 is inserted to the certain position, the turn table 3C side is rotated to be advanced on the moving path of the optical disc 1, so that the turn table 3C rotatably supports the optical disc 1, allowing to perform reading processing and recording processing.

Incidentally, disk units have been desired to be downsized due to downsizing of recent information-processing equipments. Especially, downsizing has strongly been requested on portable personal computers or the like. If the whole dimension of the conventional disk unit as shown in FIGS. 1, 2A and 2B is downsized, in the state that the turn table 3C is retracted from the position for information processing as shown in FIG. 2B, a stepping motor 3E1 of the processor moving unit 3E for moving the pickup 3D and a supporting member 3E4 for rotatably supporting a lead screw 3E3 having an engaging groove 3E2 formed in a spiral manner, to which a locking and unlocking claw 3D1 of the pickup 3D is engaged, may interfere with the casing 2. Therefore, a part of the casing 2 possibly interfering may be cut out. However, a sealing member is necessary to be provided additionally because the respective components, for instance, the pickup 3D may have defect in operation or be damaged due to invasion of dusts from the outside. Thus, it is difficult to enhance manufacturability.

SUMMARY OF THE INVENTION

An object of the present invention is to provide a disk unit capable of being downsized easily.

A disk unit according to an aspect of the present invention includes: a casing having an opening through which a disc recording medium is inserted and ejected; a mount movably disposed in the casing and having a supporting portion for rotatably supporting the disc recording medium; a moving unit disposed in the casing for moving the mount such that the supporting portion is advanced onto and retracted from a moving path of the disc recording medium; an information processing section for performing at least one of a reading processing that reads out information recorded on a recording surface of the recording medium and a recording processing that records information on the recording surface; and a processor moving unit disposed in the casing for moving the information processing section along the recording surface of the disc recording medium.

BRIEF DESCRIPTION OF THE DRAWINGS

FIG. 7A is a cross-sectional view showing rotation state of the disc processing section when the disc processing section according to the first embodiment is located at the advanced position with a part thereof being cut;

FIG. 7B is a cross-sectional view showing rotation state of the disc processing section when the disc processing section according to the first embodiment is located at the retracted position during insertion or ejection of the optical disc with a part thereof being cut;

DETAILED DESCRIPTION OF PREFERRED EMBODIMENT(S)

A first embodiment of the present invention will be described below with attached drawings.

In the present embodiment, a slot-in type disk unit that records information on and reads out information from an optical disc as a disc recording medium is described as an example; however, any configuration is available as long as a mount equipped with a supporting portion moves, like the one including a tray for loading the disc recording medium. Additionally, the configuration may only read out or record information. The disc recording medium is not limited to the optical disc, and may be any kind of disc recording medium such as a magnetic disk or a magneto optical disk. Further, while the thin slot-in type installed in an electric equipment such as a portable personal computer is exemplified here, a stand-alone configuration is also available like a game player or a reproducing device for recording and reproducing video data. The configuration is not even limited to be thin.

Configuration of Disk Unit

Figure 3:
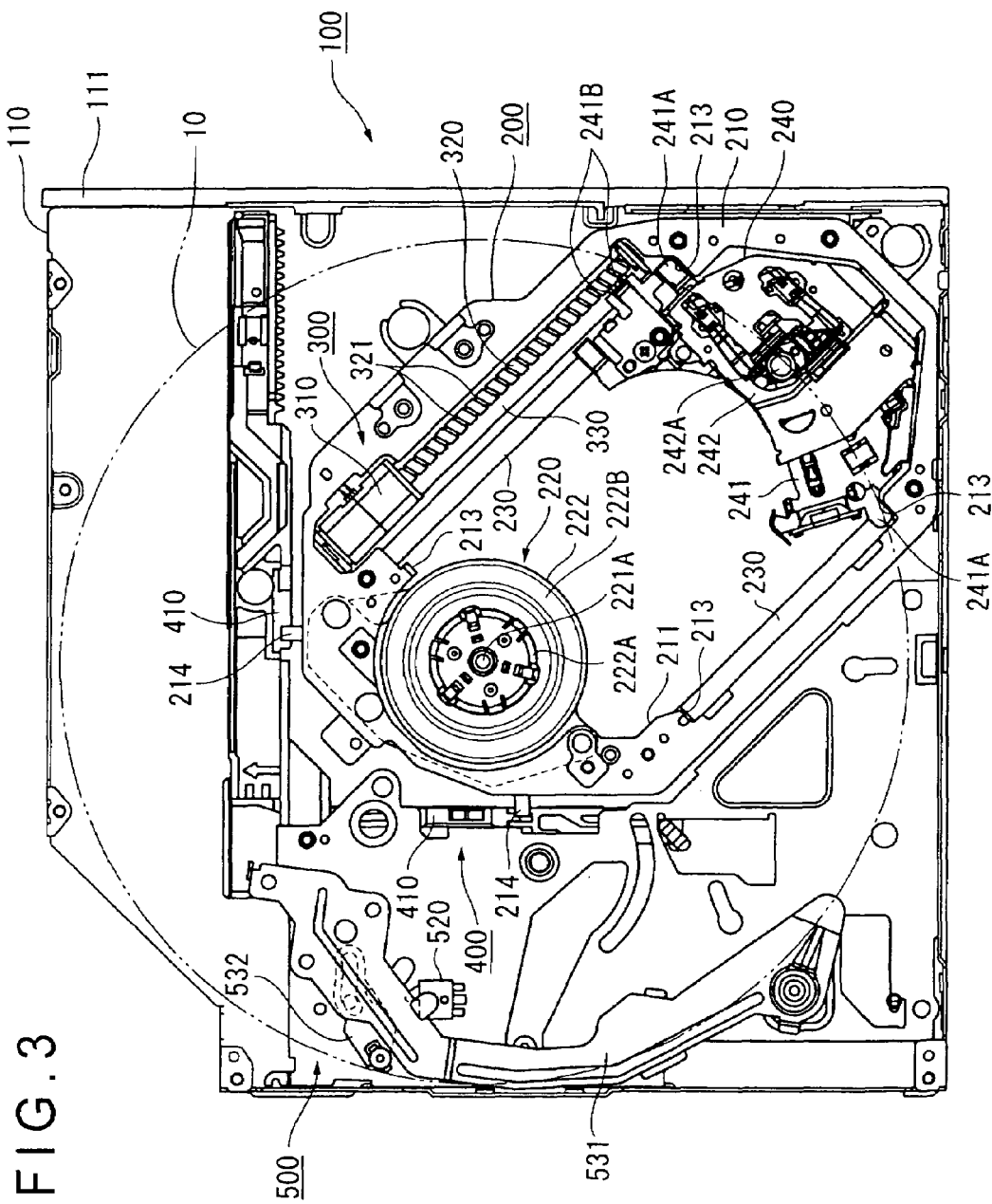
FIG. 3 is a plan view briefly showing a disk unit according to a first embodiment of the present invention with a part thereof being cut.

In FIG. 3, a disk unit 100 is the so-called thin slot-in type installed in an electric equipment such as a portable personal computer. The disk unit 100 performs reading processing as information processing that reads out information recorded on a recording surface (not shown), which is provided on at least one side of a disc-shaped optical disc 10 as the disc recording medium detachably attached to the disk unit 100, and recording processing as information processing that records various pieces of information on the recording surface. The disk unit 100 has a box-like casing 110, which is for instance made of metal and has a space inside. A decorative plate 111 is provided on a lateral surface of the casing 110, the decorative plate 111 being made of synthetic resin formed in an elongated plate. A slit-like opening (not shown) is formed in the decorative plate 111 in longitudinal direction. Disposed in the casing 110 are a disc processing section 200 which is the so-called traverse mechanism, a processor moving unit 300, a driving section 400 as a moving unit for moving the disc processing section 200, a loading unit 500 for loading the optical disc 10, and a control circuit (not shown).

Figure 4:
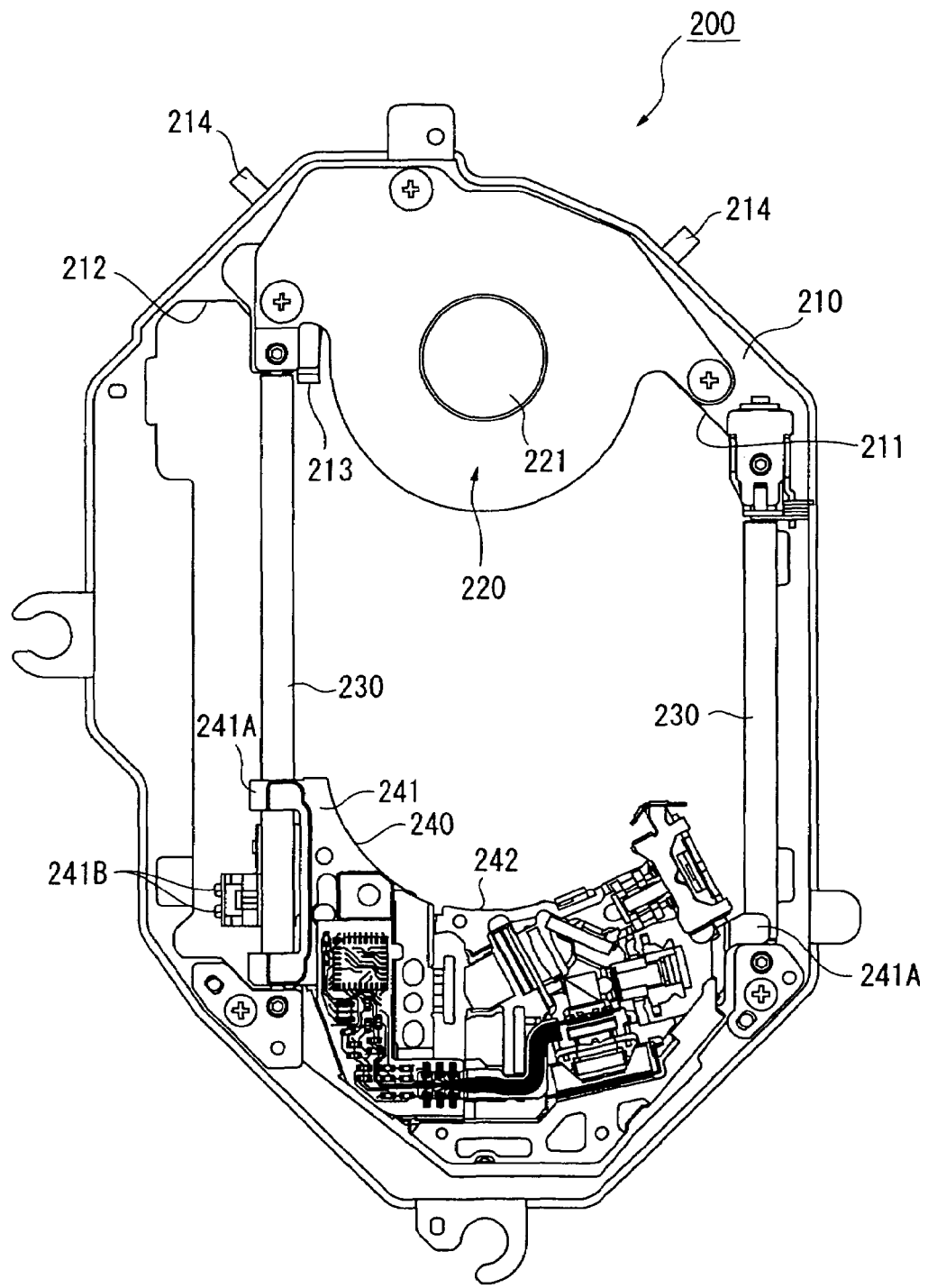
FIG. 4 is a bottom view showing a disc processing section according to the first embodiment with a part thereof being cut.

As shown in FIGS. 3 and 4, the disc processing section 200 has a mount 210 as a rotating body made of a metallic plate in a flat octagonal shape in plan view. A cutout portion 211 is formed substantially at the center of the mount 210 to be a frame. A clearance 212 is formed at the inner circumference of the mount 210, which is continuously formed with the cutout portion 211 by cutting. Further, two pairs, for instance, of steps 213 are provided on the inner circumferential surface of the cutout portion 211 of the mount 210 as a restricting unit, in which each pair is opposing to each other along the longitudinal direction of the mount 210.

A disc rotation driver 220 is arranged near the peripheral edge of the mount 210 at an end in longitudinal direction. The disc rotation driver 220 includes an electric rotating motor 221 such as a spindle motor and a turn table 222 integrally formed with an output shaft 221A of the electric rotating motor 221. The electric rotating motor 221 is controllably connected to the control circuit and driven upon the electric power supplied from the control circuit. The turn table 222 includes a substantially cylindrical rotating shaft 222A, which is a supporting portion inserted and fit to an axial hole (not shown) formed at the center of the optical disc 10 for rotatably supporting the optical disc 10, and a collar 222B projecting in flange shape on the outer circumferential surface of the rotating shaft 222A so that the peripheral edge of the axial hole of the optical disc 10 is put thereon to be held thereby. The turn table 222 is rotated by the electric rotating motor 221 together with the optical disc 10 rotatably supported.

A pair of guide shafts 230 is disposed on the mount 210 as a guide. The guide shafts 230 are formed in, for example, metallic thin rods with both ends in axial direction are supported between the steps 213 of the mount 210 in a bridged state, and disposed substantially in parallel so that the axial direction is substantially along the longitudinal direction of the mount 210.

Additionally, an information processing section 240 is disposed on the mount 210. The information processing section 240 has a movement holder 241 held by the pair of guide shafts 230 in a bridged state. The movement holder 241 has a holder 241A for inserting and fitting the guide shaft 230 in a movable manner and a movement restricting claw 241B as a locking portion. Further, the movement holder 241 is provided with a pickup 242 including a light source (not shown), a lens 242A for converging the light from the light source, and an optical sensor (not shown) for detecting the outgoing light beam reflected by the optical disc 10. The pickup 242 connected to the control circuit capable of sending/receiving signals performs reading processing that reads out various pieces of information recorded on the recording surface of the optical disc 10 to output information to the control circuit and recording processing that records various pieces of information from the control circuit on the recording surface under the control of the control circuit.

A cover (not shown) is integrally attached to the mount 210. In the caver, an elongated processing opening is formed by cutting substantially at the center of the cover along the longitudinal direction of the mount 210 corresponding to the moving path of the pickup 242 and the position of the turn table 222. The disc processing section 200 is rotatably supported by the casing 110 at the other end so that an end side of the mount 210 in longitudinal direction with the turn table 222 provided can rotate in the direction substantially along the axial direction of the rotating shaft 222A, and is rotatably disposed in the casing 110 with the turn table 222 side being the rotation end.

Figure 5:
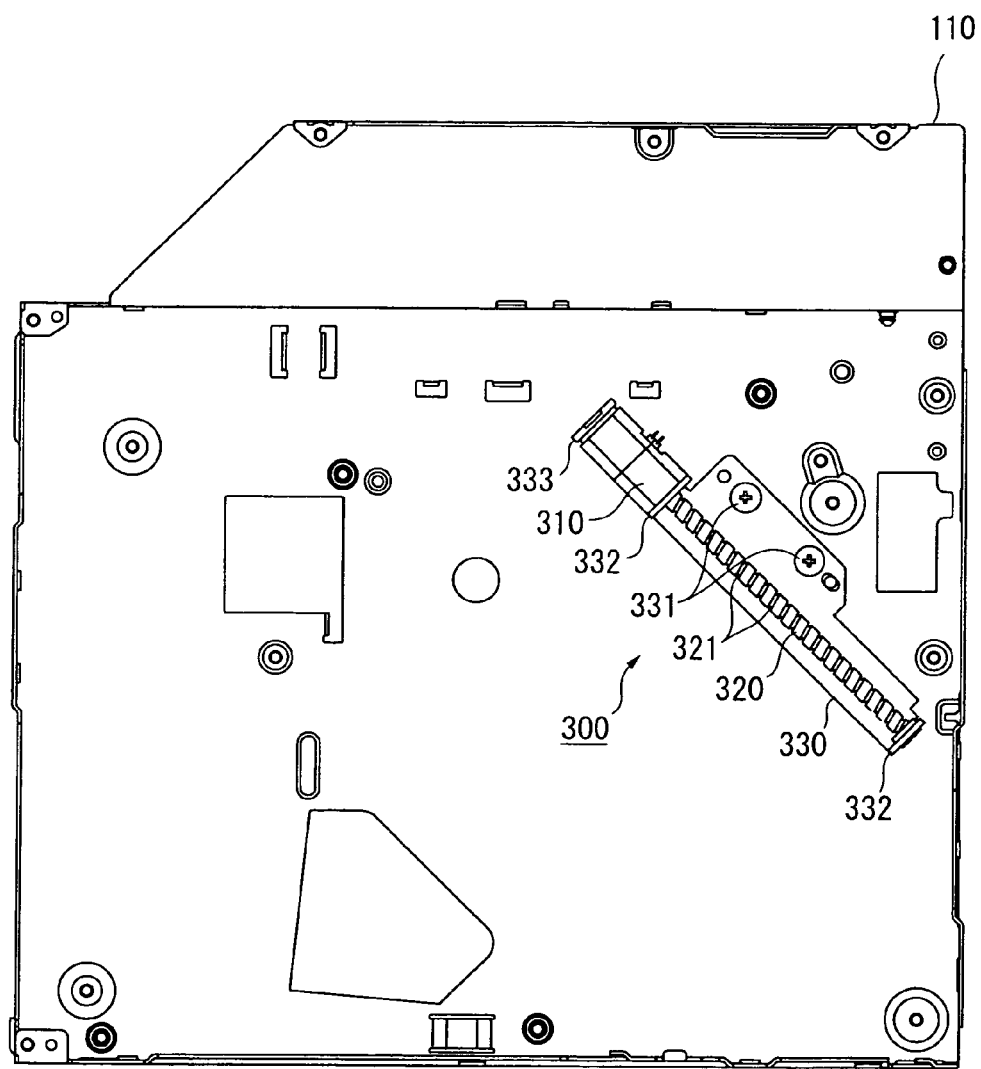
FIG. 5 is a plan view showing the bottom side of a casing according to the first embodiment.

As shown in FIG. 5, the processor moving unit 300 is integrally disposed on the bottom side of the casing 110 to move the information processing section 240 disposed on the mount 210 and supported by the guide shafts 230. The processor moving unit 300 includes an electric moving motor 310, which is an electric motor like a stepping motor, a lead screw 320 as a screw and an attachment 330. The electric moving motor 310 is controllably connected to the control circuit and driven upon the electric power supplied from the control circuit. The lead screw 320 is formed in, for instance, a metallic thin rod, and provided with an engaging groove 321 formed on the outer circumferential surface in a spiral manner as an engaging section to which the movement restricting claw 241B of the information processing section 240 is engaged. The attachment 330 is made of, for example, a metallic plate in an elongated plate and attached to the casing 110 by a screw 331 or the like. In the attachment 330, a pair of supporting plates 332 is formed by bending to face to each other in longitudinal direction for rotatably supporting the both ends in axial direction of the lead screw 320. Additionally in the attachment 330, a holding plate 333 that holds the electric moving motor 310 together with one of the supporting plate 332 is formed by bending. The attachment 330 holds the electric moving motor 310 and the lead screw 320 such that an output shaft (not shown) of the electric moving motor 310 is integrally coupled to the one end in the axial direction of the lead screw 320 in a substantially coaxial manner, and is attached on the bottom side of the casing 110. The attaching position is set corresponding to the clearance 212 of the mount 210 so that the mount 210 does not contact to the disc processing section 200 during rotation, and is disposed so that the axial direction of the lead screw 320 is in parallel to that of the guide shaft 230. In other words, the attachment is so set that the movement restricting claw 241B of the information processing section 240 will not be disengaged from the engaging groove 321 even when the lead screw 320 is rotated by the drive of the electric moving motor 310.

As shown in FIG. 3, the driving section 400 includes in the casing 110 a motor (not shown), for example, controlled by the control circuit, and a moving cam 410 moved by the drive of the motor. The moving cam 410 engages with the motor as well as the engaging claw 214 projecting outside from the mount 210 to rotate the mount 210 due to the drive of the motor. As the rotation of the mount 210, the rotating shaft 222A of the turn table 222 is advanced onto or retracted from the moving path where the optical disc 10 is loaded by the loading unit 500. Specifically, the mount 210 is rotated between an advanced position shown in FIGS. 6A and 7A in which the rotating shaft 222A of the turn table 222 is advanced onto the moving path of the optical disc 10 and a retracted position shown in FIGS. 6B and 7B in which the rotating shaft 222A of the turn table 222 is retracted from the moving path of the optical disc 10.

As shown in FIG. 3, the loading unit 500 includes in the casing 110 a loading motor (not shown) controlled by, for example, the control circuit, a linking mechanism (not shown) interlocked upon the drive of the loading motor, and a sensing switch 520 as a loading detector. The linking mechanism has a sensor arm 531, an interlocked arm 532 and a loading arm (not shown). The sensor arm 531, the interlocked arm 532 and the loading arm are made of metal and formed in elongated plates, respective ends of which in longitudinal direction are rotatably supported by the casing 110. The sensor arm 531 and the interlocked arm 532 are rotatably supported and coupled to each other at the intermediate portions of these in longitudinal direction, so that the interlocked arm 532 is rotated as the sensor arm 531 rotates. The loading arm is disposed such that the other end can rotate inward near the opening of the casing 110, the other end contacting to the peripheral edge of the optical disc 10 to load the optical disc 10. A pulley (not shown) is rotatably supported near tip end of the sensor arm 531 and the loading arm in the rotation side, the center of the pulley in axial direction being formed smaller in diameter and the circumferential surface thereof contacting to the peripheral edge of the optical disc 10. The sensor arm 531 and the loading arm are able to move outside against the biasing force when a relatively strong force is applied thereto. To be more specific, the arms can rotate as these are pushed outside by the peripheral surface of the optical disc 10 when the optical disc 10 is pushed into the opening.

The sensing switch of the driving unit (translator's comment: correctly, the loading unit 500) is disposed in the casing 110 and turned on/off owing to the rotation state of the interlocked arm 532. More specifically, the sensing switch is turned off when the sensor arm 531 is located near the loading-completion position which is the substantially same position as the standby position (see FIG. 3), and is turned on when the sensor arm 531 is in the rotating state other than locating at the position described above The on/off signals of the sensing switch 520 are output to the controlling section controller of the control circuit.

The control circuit is constituted as a circuitry on a circuit board in which various electric equipments are mounted, and controls the entire operation of the disk unit 100. When sensing the insertion of the optical disc 10 according to the on/off state of the sensing switch 520 of the loading unit 500, or recognizing that the sensing switch 520 is in the off state, the control circuit determines that the optical disc 10 has been inserted, and controls the driving section 400 to rotate the disc processing section 200 to the advanced position shown in FIGS. 6A and 7A. Further, when recognizing, for example, the operation of an eject button to request ejection of the optical disc 10, or recognizing a command signal for ejecting the optical disc 10 from the electric equipment, the control circuit controls and drives the electric moving motor 310 to move the information processing section 240 to the end position on the rotation base end side of the mount 210, specifically, to the outermost position A shown in FIG. 8. Furthermore, when recognizing that the information processing section 240 has been moved to the end position, the control circuit controls and operates the driving section 400 to rotate the disc processing section 200 to the retracted position shown in FIGS. 6B and 7B. Then, the control circuit drives the loading motor of the loading unit 500 to move the linking mechanism so that the optical disc 10 is ejected from the opening.

Operation of Disk Unit

The operation of the disk unit 100 according to the first embodiment will be described below.

First, the electric power is supplied to the disk unit 100 by turning on the power of the electric equipment. Owing to the electric power supply, the control circuit recognizes the rotation state of the disc processing section 200 according to the on/off state of the sensing switch 520. More specifically, when the sensing switch 520 is in the off state, it is determined that the sensor arm 531 of the linking mechanism is in the standby state, the disc processing section 200 is located at the advanced position shown in FIGS. 6A and 7A, and the optical disc 10 is inserted and located at the loading-completion position. On the other hand, when the sensing switch 520 is in the on state, it is determined that the tip end of the sensor arm 531 is rotated to the opening side, the disc processing section 200 is located at the retracted position shown in FIGS. 6B and 7B, i.e. as the insertion standby state for the optical disc 10 without the optical disc 10 inserted. Then, the control circuit outputs a signal that represents whether the optical disc 10 is inserted or not to the circuit controlling the operation of the electric equipment.

When the optical disc 10 is inserted from the opening at the insertion standby state for the optical disc 10, the peripheral edge of the optical disc 10 contacts to the pulley of the sensor arm 531. If the optical disc 10 is further pushed in this state, the sensor arm 531 and the loading arm are pushed out against the biasing force to be rotated outside. As the optical disc 10 is pushed to a certain position, the loading arm passes over the peripheral edge of the optical disc 10, and consequently, the biasing force is again applied to the loading arm to be rotated inward, so that the optical disc 10 is loaded to the loading-completion position by the biasing force.

When the optical disc 10 is loaded just before the loading-completion position shown in FIG. 3, the sensing switch 520 is turned off. When recognizing that the sensing switch 520 is in the off state, the control circuit drives the motor of the driving section 400 to move the moving cam 410 and to start rotating the disc processing section 200 to the advanced position shown in FIGS. 6A and 7A. When the optical disc 10 is loaded to the loading-completion position shown in FIG. 3, the sensor arm 531 is located at the standby position and the optical disc 10 is restricted from being moved. Since the optical disc 10 is located at the loading-completion position, the rotating shaft 222A of the turn table 222 of the rotating disc processing section 200 is inserted and fit to the axial hole opened substantially at the center of the optical disc 10 and the optical disc 10 is rotatably supported by the turn table 222 as shown in FIGS. 6A and 7A.

Figure 6A:
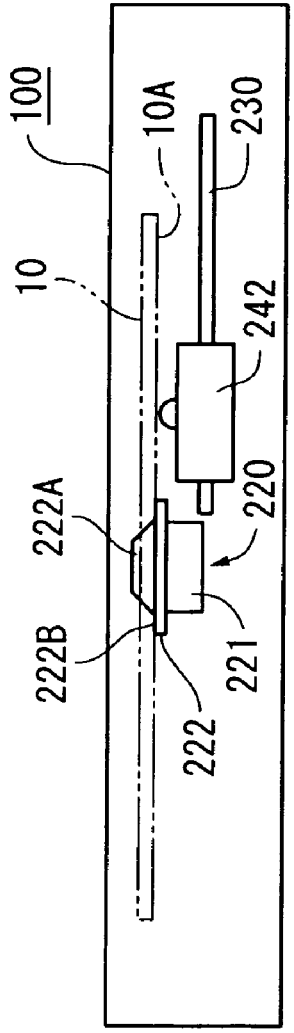
FIG. 6A is an explanatory illustration showing rotation state of the disc processing section when the disc processing section according to the first embodiment is located at an advanced position.
Figure 8:
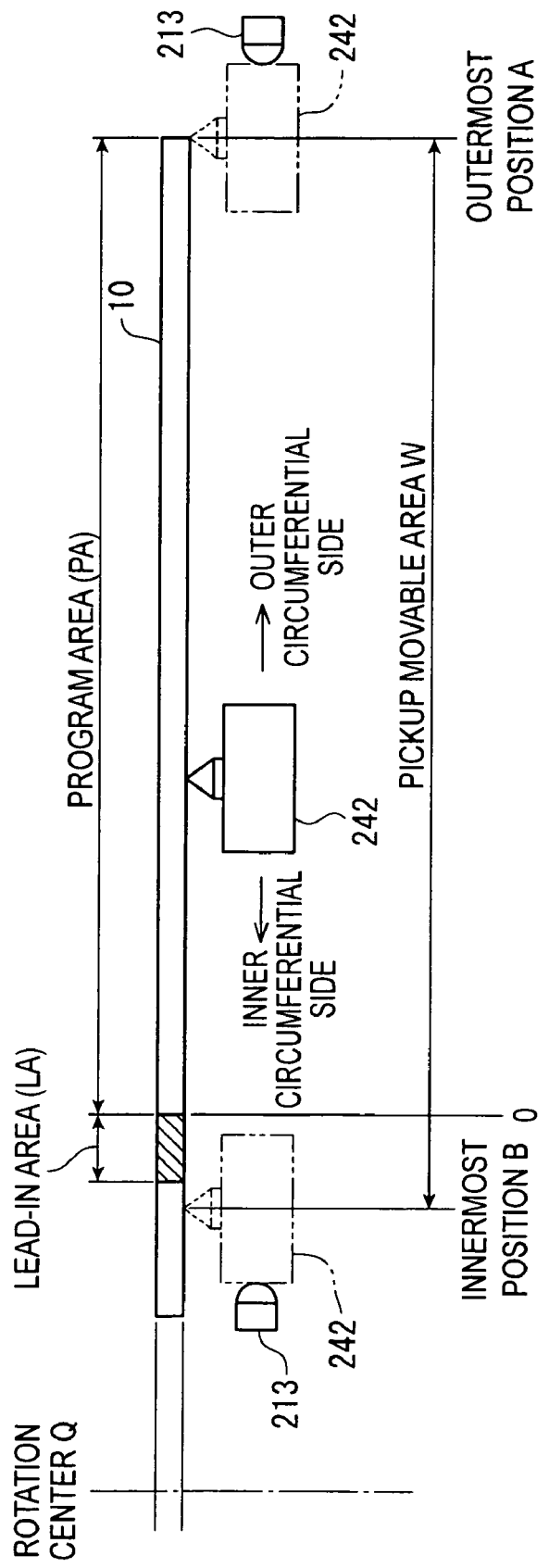
FIG. 8 is an explanatory view showing moving status of a pickup according to the first embodiment.

Then, the control circuit determines that the optical disc 10 is loaded to the loading-completion position and the disc processing section 200 is located at the advanced position shown in FIGS. 6A and 7A to rotatably support the optical disc 10 according to the off state of the sensing switch 520, and performs initialization to recognize the position of the pickup 242. In other words, as shown in FIG. 8, the control circuit supplies the drive pulse of the drive frequency to the electric moving motor 310, the number of which is equal to or slightly greater than the number necessary to move the whole distance of a movable area W where the pickup 242 moves to the turn table 222 side, i.e. the inner circumferential side of the optical disc 10. Supplying the drive pulse, the information processing section 240 is moved to the inner circumferential side and contacts to the step 213 of the disc processing section 200 located on the inner circumferential side of the turn table 222. Then, when recognizing that the predetermined number of drive pulse has been supplied, the control circuit determines that the pickup 242 is located at the innermost position B, sets an internal counter as a value indicating the innermost position B, and recognizes the position of the pickup 242.

In response to the request of information processing such as reading processing that reads out various pieces of information recorded on the recording surface of the optical disc 10 and recording processing that records various pieces of information on the recording surface, the control circuit controls the operation of the electric rotating motor 221, the electric moving motor 310 and the pickup 242 to perform information processing. When being the standby state for the next operation such as that after the end of information processing or the end of initialization, the control circuit outputs the predetermined number of drive pulse to the electric moving motor 310 according to the internal counter so that the information processing section 240 is located at the standby position, or the pickup 242 is located at the outermost position A.

On the other hand, when recognizing, for example, the operation of the eject button requesting ejection of the optical disc 10 or the request signal requesting ejection of the optical disc 10 from the electric equipment, the control circuit controls the drive of the electric moving motor 310 to move the information processing section 240 such that the pickup 242 is located at the outermost position A on the rotation base end side of the disc processing section 200 as shown in FIG. 8. Then, the control circuit drives the motor of the driving section 400 to move the moving cam 410, and rotates the disc processing section 200 to the retracted position as that shown in FIGS. 6B and 7B. Because the disc processing section 200 rotating, the rotating shaft 222A of the turn table 222 is released from the optical disc 10. After the disc processing section 200 is rotated, the control circuit drives the loading motor and rotates the sensor arm 531 to push out the optical disc 10, so that the optical disc 10 is ejected from the opening. Note that the ejecting state means that the optical disc 10 is not ejected completely, but a part of the optical disc 10 is remained inside the opening and supported not to be fallen.

Advantages of First Embodiment

Figure 1:
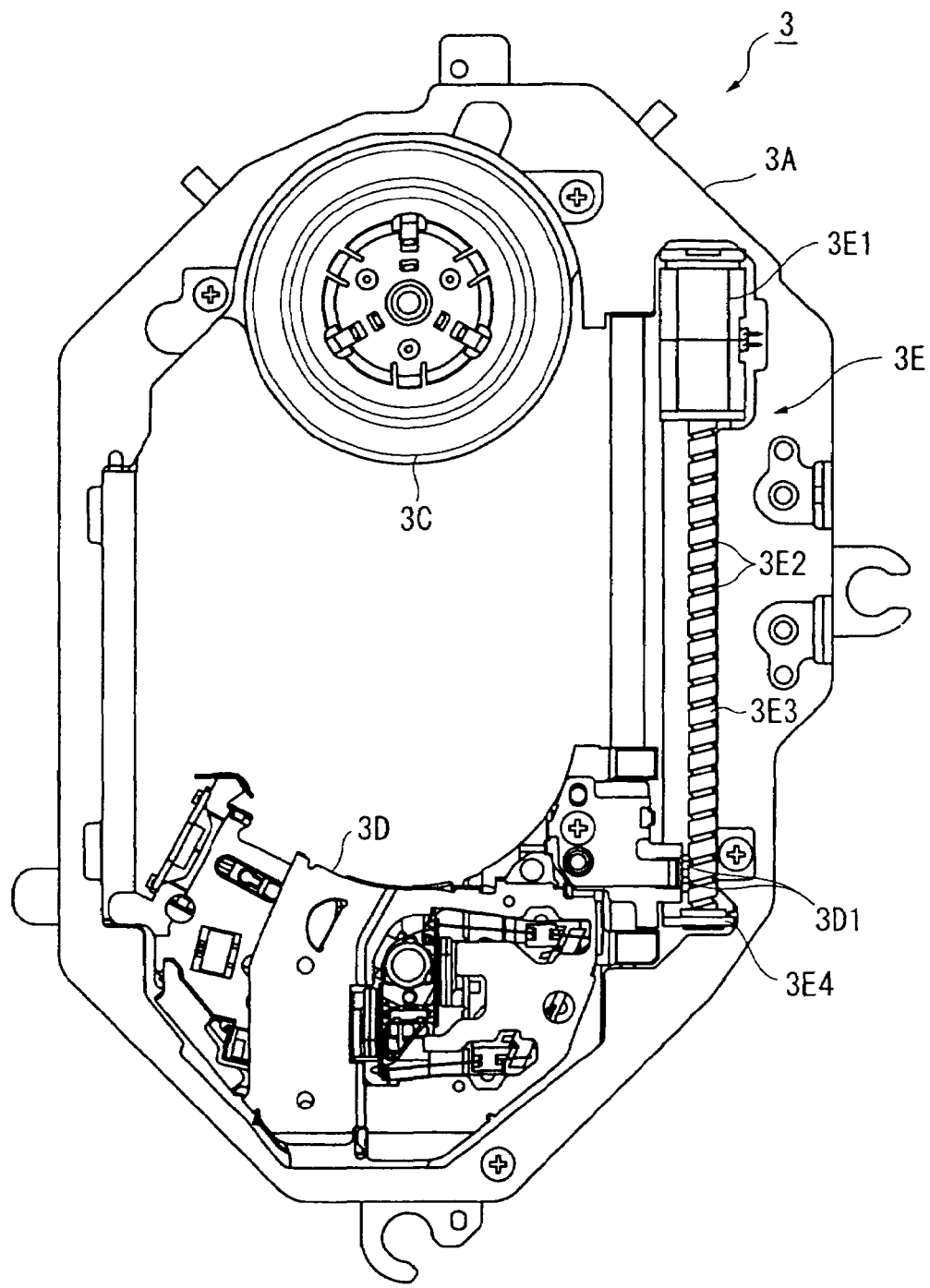
FIG. 1 is a plan view showing a disc processing section of a conventional disk unit.
Figure 2A:
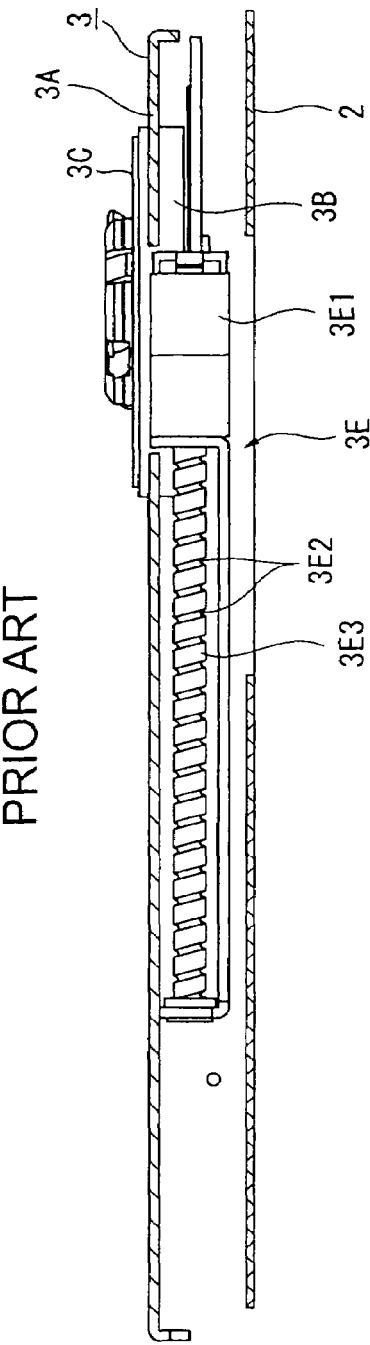
FIG. 2A is a cross-sectional view showing rotation status of the disc processing section when the conventional disc processing section is located at an advanced position with a part thereof being cut.
Figure 2B:
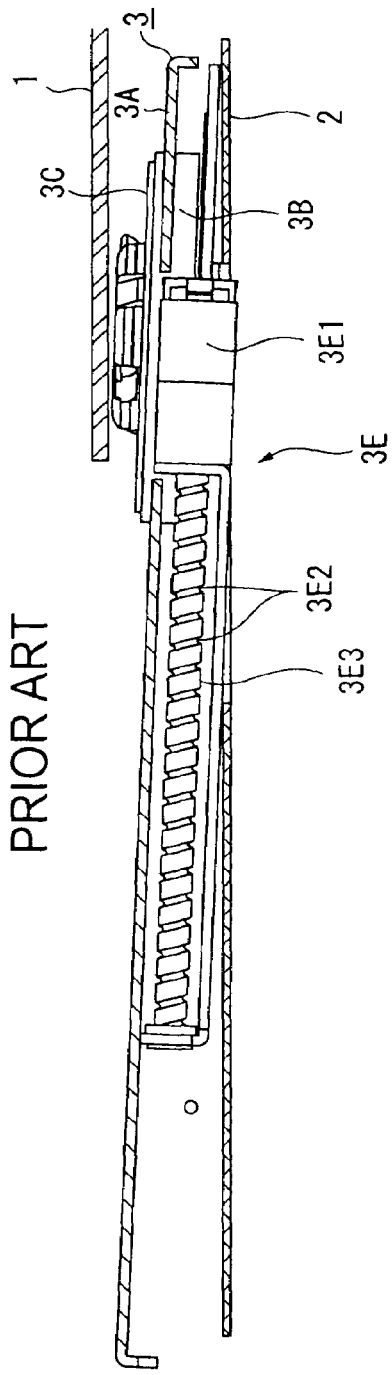
FIG. 2B is a cross-sectional view showing rotation status of the disc processing section when the conventional disc processing section is located at a retracted position during insertion or ejection of an optical disc with a part thereof being cut.
Figure 6B:
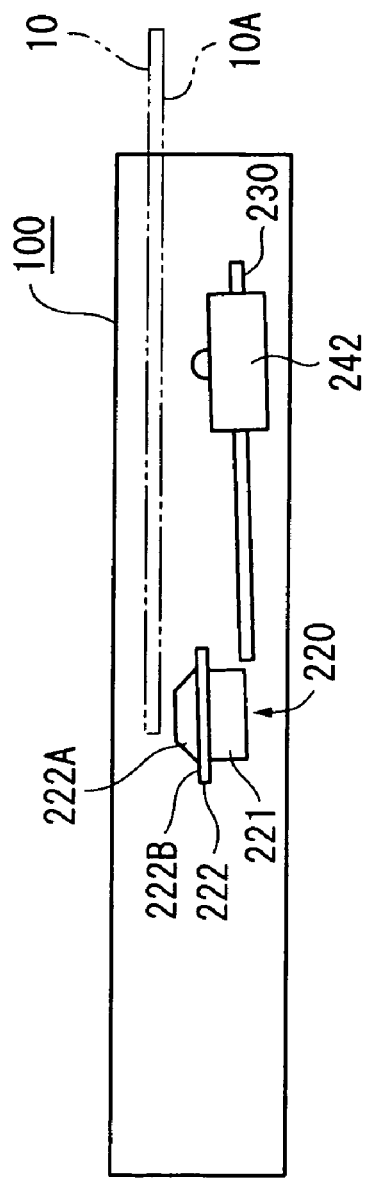
FIG. 6B is an explanatory illustration showing rotation state of the disc processing section when the disc processing section according to the first embodiment is located at a retracted position during insertion or ejection of an optical disc.

As described in the first embodiment, the mount 210 of the disc processing section 200, on which the turn table 222 rotatably supporting the optical disc 10 and the information processing section 240 for performing reading processing that reads out information from the recording surface of the optical disc 10 and recording processing that records information on the recording surface are disposed, is movably disposed in the casing 110, and also the processor moving unit 300 that moves the information processing section 240 along the recording surface of the optical disc 10 is integrally attached on the bottom side of the casing. Therefore, when the mount 210 is moved as shown in FIGS. 6B and 7B such that the turn table 222 does not interfere with the optical disc 10 during insertion or ejection of the optical disc 10, the processor moving unit 300 will not interfere with the casing 110 unlike the conventional art shown in FIG. 1, thereby the casing 110 being downsized preferably. Since there is no need to form a hole preventing the processor moving unit 300 from interfering with the casing 110, the manufacturability of the casing 110 can easily be enhanced, the strength of the casing 110 will not be deteriorated and the respective components will not have defects in operation by invasion of dusts due to the hole, thus providing proper information processing.

Since the processor moving unit 300 would not move together with the rotation of the mount 210, the electric moving motor 310 may be enlarged by the capacity of the moving amount. Owing to this, there is generated the excess driving torque in the electric moving motor 310 in compared to the conventional art, thus providing the highly qualified and stable movement of the information processing section 240.

The information processing section 240 is movably disposed on the mount 210 being moved with the turntable 222 for rotatably supporting the optical disc 10. Since the turn table 222 that rotatably supports the optical disc 10 for information processing and the information processing section 240 that performs information processing are integrally formed on the mount 210, positional setting of the optical disc 10 is easy and information processing can stably be provided.

The movement restricting claw 241B provided in the information processing section 240 disposed on the mount 210 is engaged with the spiral engaging groove 321 of the lead screw 320 integrally and coaxially coupled with the output shaft of the electric moving motor 310 to be rotated around the axial direction as a rotation axis. Therefore, by the drive of the processor moving unit 300 fixed in the casing 110, the information processing section 240 disposed on the mount 210 being rotated can be moved, only with the simple configuration of engaging the claw. This configuration can easily be used for the conventional structure without an additional component, thus easily enhancing manufacturability.

The information processing section 240 is movably supported by the pair of guide shafts 230 disposed on the mount 210. Accordingly, when the information processing section 240 is moved by the operation of the processor moving unit 300, the movement can easily be stable along the recording surface of the optical disc 10, only with the guide shafts 230 being provided on the mount 210.

There are a projecting claw profile on the information processing section 240 side which moves, and a spiral groove profile on the processor moving unit 300 side which is moved. Therefore, not only engagement can easily be provided even if the mount 210 is rotated, but also the movement restricting claw 241B and the engaging groove 321 can easily be formed, thus easily enhancing manufacturability.

The clearance 212 is provided so that the processor moving unit 300 does not interfere with the mount 210. Therefore, the processor moving unit 300 that moves the information processing section 240 can be disposed without interfering with the mount 210 even when the mount 210 is moved. Additionally, since the processor moving unit 300 can integrally be disposed on the mount 210 to be located at the clearance 212 like the conventional art, the components can be shared, thus easily lowering the cost.

The disc processing section 200 is moved as being rotated, and the information processing section is rotated by the processor moving unit 300 when the disc processing section 200 is rotated to the rotation base end side so that the pickup 242 is moved to be located at the outermost position A, under the control of the control circuit. Therefore, the disc processing section 200 can be moved with the simple configuration using the moving cam 410. When being rotated to the standby position, the pickup 242 is located at the position being retracted so as not to contact to the bottom side of the casing 110. Thus, the casing 110 can further be downsized, and it is not required to add a particular configuration of forming a hole, a recess or the like to prevent the pickup 242 from contacting to the casing 110. Accordingly, the manufacturability of the casing 110 can be enhanced and the strength of the casing 110 will not be deteriorated.

Since the disc processing section 200 is moved to the rotation base end side, the information processing section 240 and the lead screw 320, which engages with each other at the position, may have the least fluctuation in the relative positional relationship, may avoid to disengage from each other, and may be prevented from being damaged at the engaging portions, thus providing secure engagement. Furthermore, the positions relatively engaged are hardly be deviated by rotation; information processing can be provided by the stable information processing section 240.

The control circuit controls the movement of the electric moving motor 310 such that the retracted position of the information processing section 240 located at the position where the information processing section 240 is retracted during rotation of the disc processing section 200, i.e. when the pickup 242 is located at the outermost position A, is the same as the standby position for the next processing. Accordingly, because the information processing section 240 is not required to be moved when the disc processing section 200 is rotated after the standby state, the period of time required to eject the optical disc 10 can be shortened, thus improving the usability.

Second Embodiment

A second embodiment of the present invention will be described below with attached drawings.

Configuration of Disk Unit

Figure 9:
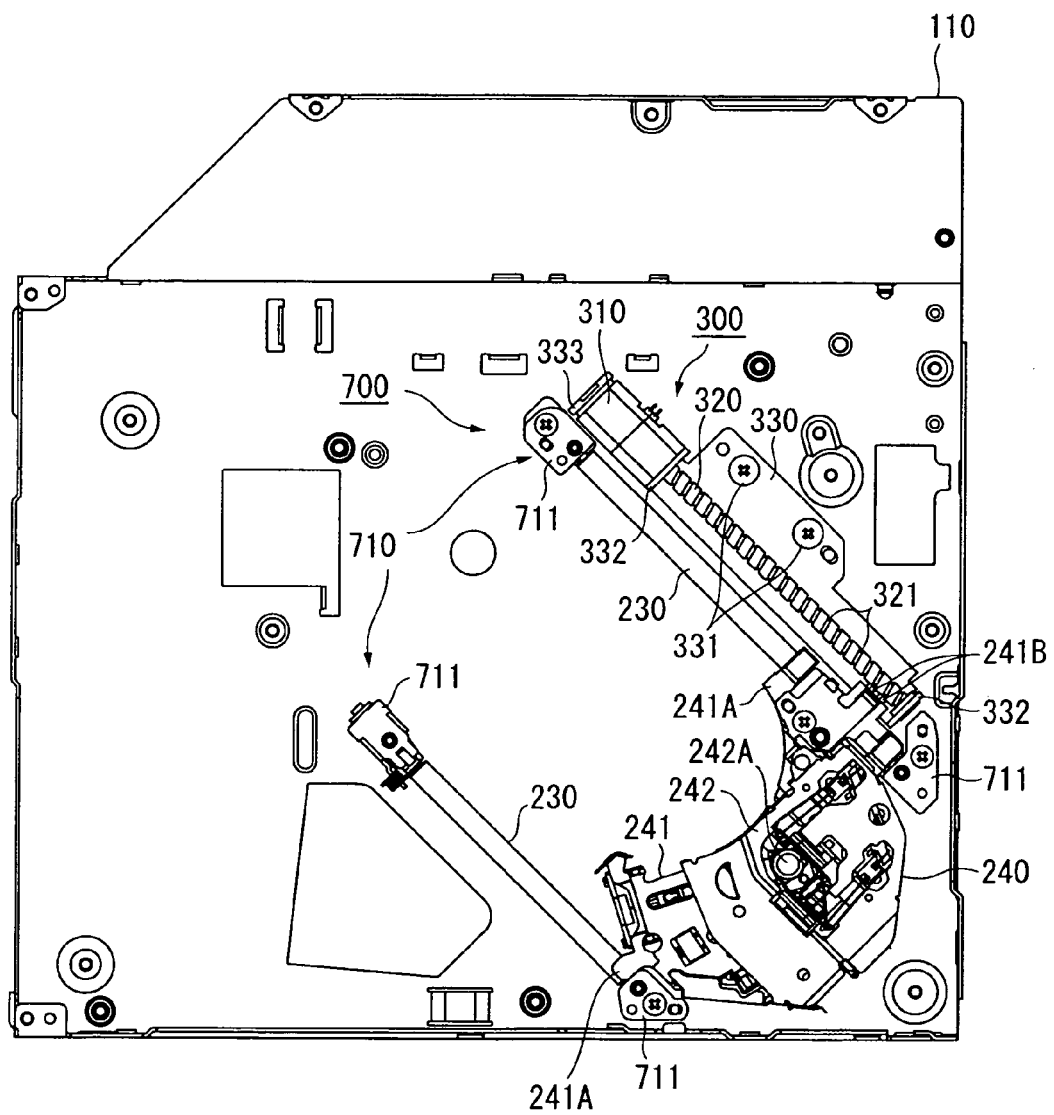
FIG. 9 is a plan view showing the bottom side of a casing of a disk unit according to a second embodiment.
Figure 10:
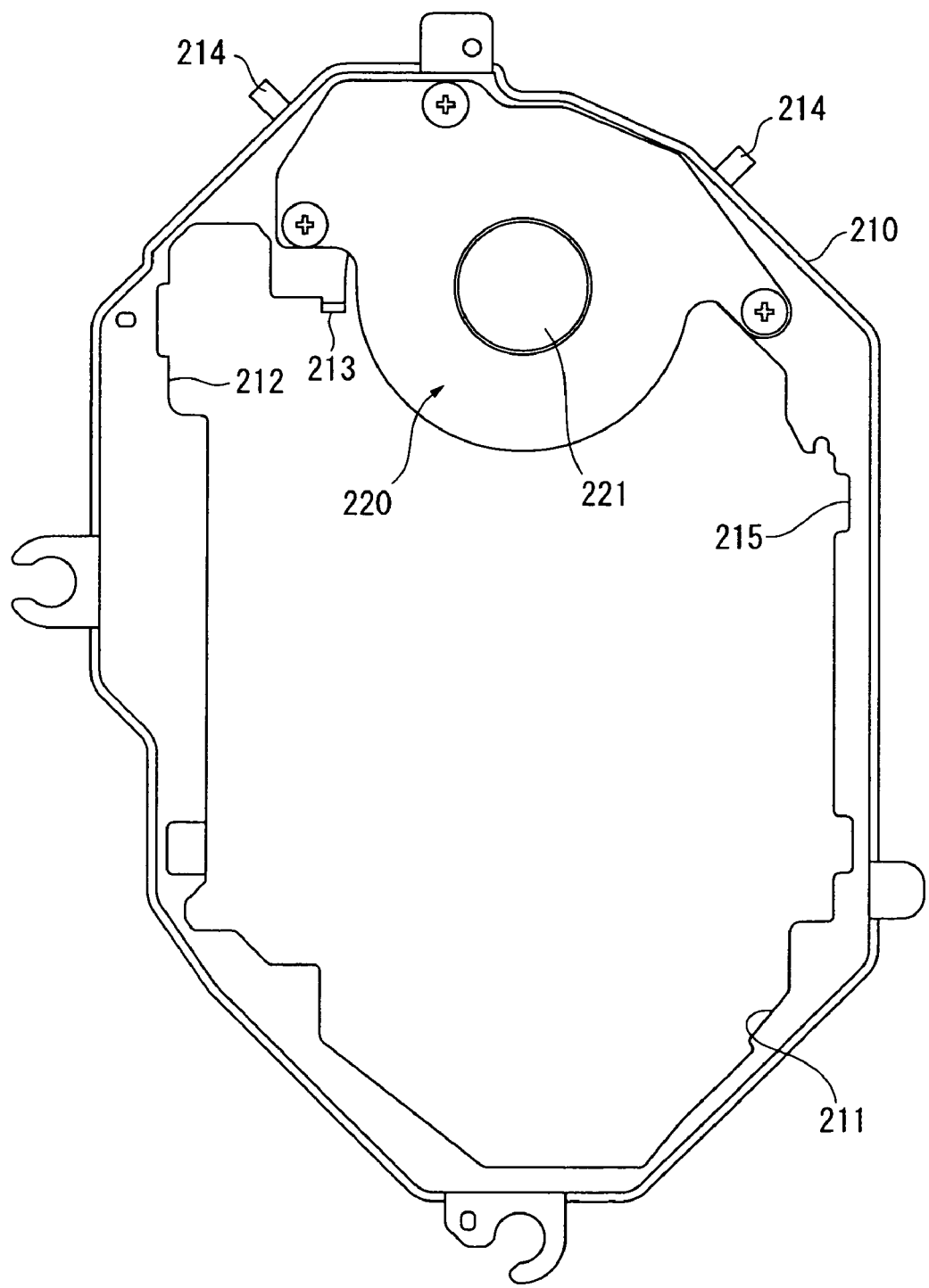
FIG. 10 is a bottom view showing a disc processing section according to the second embodiment with a part thereof being cut.

The second embodiment is shown in FIGS. 9 and 10. Note that, the same numerals are applied to the same configurations as that of the first embodiment to omit or simplify those descriptions.

In FIG. 9, the numeral 600 represents a disk unit, and is for instance a thin slot-in type installed in an electric equipment such as a portable personal computer. The disk unit 600 has the same casing 110 as that of the first embodiment. The mount 210, the moving processing section 700 as a processor moving unit, the driving section 400 for moving the mount 210, the loading unit 500 and the control circuit (not shown) are disposed in the casing 110.

Similar to the clearance 212, a second clearance 215, which is continuously formed with the cutout portion 211 is provided in the mount 210 at the position corresponding to the pair of guide shafts 230 in the first embodiment. The disc rotation driver 220 is disposed on the mount 210 in the same manner as the first embodiment.

The moving processing section 700 is integrally disposed on the bottom side of the casing. The moving processing section 700 includes a guiding section 710 as a guide for movably supporting the information processing section 240, and a processor moving unit 300 of the first embodiment. The guiding section 710 has the pair of guide shafts 230 as the first embodiment, and shaft holders 711 respectively supporting these guide shafts 230. The shaft holders 711 support ends in axial direction of the guide shafts 230 and are integrally attached on the bottom side of the casing 110 by screwing or the like. The guiding section 710 is disposed corresponding to the second clearance 215 of the mount 210 so that the guide shafts 230 are parallel to each other in radial direction of the optical disc 10 rotatably supported by the turn table 222 of the mount 210 which is rotatably supported without the guiding section 710 contacting to the mount 210 even when the mount 210 is rotated.

The information processing section 240 is supported by the guiding section 710 of the moving processing section 700. The information processing section 240 is guided and moved by the guiding section 710 due to the lead screw 320 rotated by the drive of the electric moving motor 310 with the movement restricting claw 241B being engaged with the engaging groove 321 of the lead screw 320 of the processor moving unit 300.

The control circuit controls the entire operation of the disk unit 600 in the same manner as the first embodiment. Note that, the control circuit may not perform the processing to move the information processing section 240 to the outermost position A when the disc processing section 200 of the first embodiment is rotated.

Advantages of Second Embodiment

As described above in the second embodiment, the processor moving unit 300, which moves the information processing section 240 along the recording surface of the optical disc 10, is integrally attached on the bottom side of the casing 110, as well as the mount 210, on which the turn table 222 rotatably supporting the optical disc 10 is disposed, is movably arranged in the casing 110. Accordingly, as the first embodiment, the processor moving unit 300 will not interfere with the casing 110 when the mount 210 is rotated unlike the conventional art shown in FIG. 1, thus the casing 110 being preferably downsized. Since there is no need to form a hole preventing the processor moving unit 300 from interfering with the casing 110, the manufacturability of the casing 110 can easily be enhanced, the strength of the casing 110 will not be deteriorated and the respective components will not have defects in operation by invasion of dusts due to the hole, thus providing proper information processing.

The clearance 212 and the second clearance 215 are provided in the mount 210 not to interfere with the moving processing section 700. Therefore, as the first embodiment, the moving processing section 700 assembled with the information processing section 240 can be disposed without the moving processing section 700 interfering with the mount 210 even when the mount 210 is moved. Further, not only the processor moving unit 300 may integrally be disposed on the mount 210 to be located at the position of the clearance 212, but also the guiding section 710 may integrally be disposed on the mount 210 to be located at the position of the second clearance like the conventional art, thus sharing the components and easily lowering the cost.

In the second embodiment, the information processing section 240 is integrally disposed on the moving processing section 700 that is integrally attached to the casing 110 with being independent from the mount 210 to be rotated. Therefore, in addition to the advantages of the above first embodiment, vibration due to the rotation of the mount 210 is hardly transferred to the information processing section 240, thus providing stable information processing. Further, the information processing section 240 is supported by the moving processing section 700 that moves the information processing section 240. Therefore, since the information processing section 240 is integrally assembled with the moving configuration, the fine information processing section 240 can highly accurately and stably moved, thus proving proper information processing and easily enhancing manufacturability in assembly.

The engagement between the information processing section 240 and the lead screw 320 will not be fluctuated even when the mount 210 is rotated, so that the information processing section 240 will not move due to rotation of the mount 210, thus surely providing stable information processing. Since the information processing section 240 is integrally disposed to the moving processing section 700 attached to the casing 110, the information processing section 240 will not interfere with the casing 110 even when the mount 210 is rotated. Therefore, there is no need to move the information processing section 240 to the retracted position on the rotation base end side during rotation of the mount 210 so that the pickup 242 is located at the outermost position A. Accordingly, the processing can be speeded up easily as described above.

[Modifications]

Note that the present invention is not limited to the above embodiments but includes modifications as long as an object of the present invention can be attained.

While the disk unit 100, 600 using the disc recording medium is exemplified, any type of disc recording medium such as a magnetic disk or a magneto optical disk can be used, and any configuration can be used other than the so-called slot-in type as long as the mount having the supporting portion moves. The disk unit is also applicable to the one only performs either reading processing or recording processing. Without limiting to the linking mechanism as the loading unit 500, any configuration such as a roller may be used for carriage. The disk unit may not be installed in the electric equipment, and may be a stand-alone unit. Further, the control circuit which is a circuit board installed in the disk unit 100 may be an element or a program.

The information processing section 240 equipped with the pickup 242 may not be moved by the stepping motor, and may be moved by any kind of motor.

The information processing section 240 may not be moved along the recording surface of the disc recording medium by the rotation of the lead screw 320 with being supported by the pair of guide shafts 230, and any configuration may be used. For instance, the information processing section 240 may be moved by switching polarity while being supported by the magnetic force such as a liner motor.

Although the mount 210 is rotated, may be moved in any moving state. For instance, the mount 210 may entirely be slid. The moving configuration may employ any means such as a linking mechanism other than the moving cam 410.

As the configuration to restrict movement of the pickup 242 in the initialization, it is not limited to use the step 213 of the mount 210 or the shaft holder 711 of the guiding section 710, and any configuration may be employed. For instance, a bulged portion with about the end of the guide shaft 230 being enlarged in diameter can be used to restrict the movement. Note that, the use of the step 213 allows omitting an additional configuration for restricting the movement, thus simplifying the structure, enhancing manufacturability, and further being downsized easily.

Although the disc processing section 200 is rotated by driving the motor to move the moving cam 610 (translator's comment: correctly, 410), any configuration is available. For example, the disc processing section 200 is rotated by moving the moving cam 610 (translator's comment: correctly, 410) together with rotation of the sensor arm 731. Although the configuration is started to rotate when the optical disc 10 is located at the position right before the loading-completion position, the rotation may be started after the optical disc 10 is located at the loading-completion position. Note that, in this configuration, since the rotation is started right before the loading-completion position and the rotating shaft 222A is inserted and fit to the axial hole at the loading-completion position, operations proceed in parallel, thereby shortening the period of time necessary to start information processing and improving usability.

In the first embodiment, although the standby position is described as the outermost position A, the standby positions can be changed in accordance with processing contents to set the innermost position B as the standby position when being the standby state for the next information processing. Similarly, in the second embodiment, the movement can be controlled such that the standby position is the innermost position B. Accordingly, in case that the optical disc 10 is CD-DA (Compact Disk-Digital Audio), since the optical disc 10 usually records information for recognizing the contents of information, such as TOC (Table Of Contents) information on the Lead-in-Area of the inner circumferential side, the information processing section 240 is only required to be moved for a bit distance to the position, where the internal counter indicates "0" to focus on the boundary of the Lead-in-Area and the PA (Program Area) when the information processing is performed from the standby state or when it is detected whether or not there is the optical disc 10. Accordingly, the period of time required for information processing or moving the internal counter to the "0" can be shorten, thus easily providing quick processing. Further, the processing about the standby positioning can be omitted.

Although the mount 210 is rotated while the movement restricting claw 241B of the information processing section 240 engages with the engaging groove 321 of the lead screw 320, may disengage when the information processing section 240 is retracted not to be moved, and may engage when the information processing section 240 is rotated to the advanced position. In this case, it is preferably engaged from the rotation direction. Additionally, since the position of the information processing section 240 may be deviated at the engagement, initialization is preferable to be performed for recognizing the position of the information processing section 240 due to loss of synchronism.

Specific structures and procedures for implementing the present invention can appropriately be changed to other structures or the like as long as an object of the present invention can be attained.

[Advantages of Modifications]

As described above, the processor moving unit 300, which moves the information processing section 240 along the recording surface of the optical disc 10, is integrally attached on the bottom side of the casing 110, as well as the mount 210, on which the turn table 222 rotatably supporting the optical disc 10 is disposed, is movably arranged in the casing 110. The processor moving unit 300 will not interfere with the casing 110 when the mount 210 is rotated, so that there is no need to form a hole preventing the processor moving unit 300 from interfering with the casing 110. Accordingly, the manufacturability of the casing 110 can easily be enhanced, the strength of the casing 110 will not be deteriorated and the respective components will not have defects in operation by invasion of dusts due to the hole, thus being downsized properly.

The priority application Number JP2004-103616 upon which this patent application is based is hereby incorporated by reference.

What is claimed is:

1. A thin slot-in disc unit for a disc recording medium, comprising:
    a casing having an opening through which the disc recording medium is inserted and ejected;
    a mount rotatably disposed in the casing and including a supporting portion for the disc recording medium to rotate thereon, the mount constituting a rotating body that is rotated between an advanced position and a retracted position relative to the casing;
    a moving unit disposed in the casing for rotating the mount such that the supporting portion is advanced onto and retracted from a moving path of the disc recording medium;
    an information processing section for performing at least one of a reading processing that reads out information recorded on a recording surface of the recording medium and a recording processing that records information on the recording surface;
    a processor moving unit directly and integrally attached to a bottom plate of the casing for moving the information processing section along the recording surface of the disc recording medium, wherein the processor moving unit does not move together with the rotation of the mount; and
    a guide for guiding the movement of the information processing section, wherein:
    the information processing section includes a locking portion,
    the processor moving unit includes an electric motor that is integrally attached on the bottom side of the casing and a screw elongated along the moving direction of the information processing section, the locking portion being engaged with a spiral engaging section of the screw, the screw being driven by the electric motor around an axial direction as a rotation axis, and
    the mount is moved to the retracted position when the disc recording medium is inserted and ejected through the opening and is moved to an advanced position when the disc recording medium is supported by the supporting portion.

2. The thin slot-in disc unit according to claim 1, wherein the processor moving unit is disposed in the casing at a position opposing to the mount.

3. The thin slot-in disc unit according to claim 1, wherein the information processing section is engaged with the processor moving unit and is movable along the recording surface of the disc recording medium according to the movement of the processor moving unit.

4. The thin slot-in disc unit according to claim 1, wherein
    the mount is rotatably disposed in the casing and has the supporting portion on a rotation base end side, and
    the processor moving unit moves the information processing section to an end position on the rotation base end side of the mount, comprising an outmost disc position, during rotation of the mount.

5. The thin slot-in disc unit according to claim 1, wherein the guide is integrally attached onto the bottom plate of the casing.

6. The thin slot-in disc unit according to claim 5, wherein the mount rotates about a pivot point.

7. The thin slot-in disc unit according to claim 5, comprising a loading unit capable of carrying the disc recording medium and detecting an insertion of the disc recording medium, the moving unit rotating the mount such that the supporting portion is advanced onto the moving path when the loading unit detects the insertion of the disc recording medium.

8. The thin slot-in disc unit according to claim 7, wherein the loading unit comprises a sensor arm movable by the disc recording medium to indicate an insertion of the disc recording medium into the disc unit.

9. The thin slot-in disc unit according to claim 5, wherein the guide is integrally attached on the bottom plate of the casing by screwing.

10. The thin slot-in disc unit according to claim 1, wherein the guide is disposed onto the mount.

11. The thin slot-in disc unit according to claim 10, wherein the mount rotates about a pivot point.

12. The thin slot-in disc unit according to claim 10, comprising a loading unit capable of carrying the disc recording medium and detecting an insertion of the disc recording medium, the moving unit rotating the mount such that the supporting portion is advanced onto the moving path when the loading unit detects the insertion of the disc recording medium.

13. The thin slot-in disc unit according to claim 12, wherein the loading unit comprises a sensor arm movable by the disc recording medium to indicate an insertion of the disc recording medium into the disc unit.

14. The thin slot-in disc unit according to claim 1, wherein the processor moving unit is directly and integrally attached to the bottom plate of the casing by screws.

* * * * *